(12) United States Patent
Choi et al.

(10) Patent No.: US 9,351,147 B2
(45) Date of Patent: May 24, 2016

(54) APPARATUS FOR SETTING ROAMING PARAMETER AND METHOD FOR THE SAME TO SET ROAMING PARAMETER

(71) Applicant: SAMSUNG SDS CO., LTD., Seoul (KR)

(72) Inventors: Kwang-Seop Choi, Seoul (KR);
You-Chang Ko, Seoul (KR);
Yang-Hwan Joe, Seoul (KR);
Young-Soo Yuk, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 14/724,094

(22) Filed: May 28, 2015

(65) Prior Publication Data

US 2015/0350873 A1 Dec. 3, 2015

(30) Foreign Application Priority Data

May 28, 2014 (KR) .......................... 10-2014-0064591

(51) Int. Cl.
*H04W 74/00* (2009.01)
*H04W 8/08* (2009.01)
*H04W 36/22* (2009.01)
*H04W 36/08* (2009.01)
*H04W 84/12* (2009.01)

(52) U.S. Cl.
CPC ................ *H04W 8/08* (2013.01); *H04W 36/08* (2013.01); *H04W 36/22* (2013.01); *H04W 84/12* (2013.01)

(58) Field of Classification Search
CPC ....... H04W 8/08; H04W 36/22; H04W 36/08; H04W 88/08
See application file for complete search history.

(56) References Cited

U.S. PATENT DOCUMENTS

| | | | |
|---|---|---|---|
| 2013/0150012 A1* | 6/2013 | Chhabra ............... | H04W 48/16 455/418 |
| 2014/0019643 A1* | 1/2014 | Raju ...................... | H04L 67/32 709/248 |
| 2015/0148031 A1* | 5/2015 | He ......................... | H04W 8/02 455/432.1 |

* cited by examiner

*Primary Examiner* — Erin File
(74) *Attorney, Agent, or Firm* — Sughrue Mion, PLLC

(57) ABSTRACT

Provided are an apparatus for setting a roaming parameter and a method for the apparatus to set a roaming parameter. The apparatus includes a receiver configured to receive terminal information from a terminal connected to a wireless local area network (LAN), a manager configured to store and manage roaming parameters according to terminal models connectable to the wireless LAN (terminal-model-specific roaming parameters), a calculator configured to calculate a roaming parameter of the terminal using the received terminal information and the terminal-model-specific roaming parameters, and a transmitter configured to transmit the calculated roaming parameter to the terminal.

12 Claims, 4 Drawing Sheets

APPARATUS FOR SETTING ROAMING PARAMETER AND METHOD FOR THE SAME TO SET ROAMING PARAMETER

CROSS-REFERENCE TO RELATED APPLICATION

This application claims priority to and the benefit of Korean Patent Application No. 10-2014-0064591, filed on May 28, 2014, the disclosure of which is incorporated herein by reference in its entirety.

BACKGROUND

1. Field

The present disclosure relates to technology for a wireless communication terminal to roam between wireless access points in a wireless local area network (LAN), and more particularly, to an apparatus for setting a roaming parameter and a method for the apparatus to set a roaming parameter.

2. Discussion of the Related Art

Recently, a variety of means are being applied for roaming or a handover of a terminal using a wireless LAN between wireless access points. Since a mobile communication network is fundamentally based on the assumption of inter-cell roaming, a mobile communication terminal receives various parameters for roaming from a base station and performs inter-cell roaming accordingly.

However, unlike a mobile communication network, a standard for roaming between access points, etc. is not defined for a wireless LAN, and thus a wireless LAN has a problem in that a determination related to roaming should be made by a terminal alone. For this reason, some business wireless LAN services employ a method of providing thresholds for scanning and roaming to a wireless LAN terminal through an agent installed in the terminal and a server in a network. However, in such a method, a threshold determined according to a network configuration, such as the design of a cell in a network, is uniformly applied in general, and thus there is a limitation in considering performance of a terminal or service requirements. In particular, since difference in performance among terminals is not taken into consideration in existing methods, a roaming threshold is determined according to a terminal of the lowest performance. Therefore, there is a problem in that unnecessary scanning and roaming occur.

SUMMARY

The present disclosure is directed to lowering the power consumption of a terminal connected to a wireless local area network (LAN) and reducing the amount of network interference resulting from roaming by applying a roaming parameter for wireless LAN roaming differently according to the type (model) of the terminal and a service to be used by the terminal.

According to an aspect of the present disclosure, there is provided an apparatus for setting a roaming parameter, the apparatus including: a receiver configured to receive terminal information from a terminal connected to a wireless LAN; a manager configured to store and manage roaming parameters according to terminal models connectable to the wireless LAN (terminal-model-specific roaming parameters); a calculator configured to calculate a roaming parameter of the terminal using the received terminal information and the terminal-model-specific roaming parameters; and a transmitter configured to transmit the calculated roaming parameter to the terminal.

The terminal information may include information for identifying a model of the terminal and information for identifying a user of the terminal.

The roaming parameter of the terminal may include at least one of a roaming threshold, a scanning interval, and a roaming delta value of the terminal.

The manager may store and manage roaming parameter correction values according to services providable in the network (service-specific roaming parameter correction values) together with the terminal-model-specific roaming parameters, and the calculator may correct the roaming parameter of the terminal using information on a service used by the terminal and the service-specific roaming parameter correction values.

The calculator may acquire the information on the service used by the terminal from a user database storing and managing terminal-specific service subscription information.

The calculator may acquire the information on the service used by the terminal from the terminal.

When at least one of the terminal-model-specific roaming parameters and the service-specific roaming parameter correction values are changed, the calculator may re-calculate the roaming parameter of the terminal to reflect the change.

According to another aspect of the present disclosure, there is provided a method for a roaming parameter setting apparatus to set a roaming parameter, the method including: receiving terminal information from a terminal connected to a wireless LAN; calculating a roaming parameter of the terminal using the received terminal information and previously stored terminal-model-specific roaming parameters; and transmitting the calculated roaming parameter to the terminal.

The terminal information may include information for identifying a model of the terminal and information for identifying a user of the terminal.

The roaming parameter of the terminal may include at least one of a roaming threshold, a scanning interval, and a roaming delta value of the terminal.

The calculating of the roaming parameter may further include correcting the roaming parameter of the terminal using information on a service used by the terminal and previously stored service-specific roaming parameter correction values.

The correcting of the roaming parameter of the terminal may further include acquiring the information on the service used by the terminal from a user database storing and managing terminal-specific service subscription information The correcting of the roaming parameter of the terminal may further include acquiring the information on the service used by the terminal from the terminal.

The method may further include, after the transmitting of the calculated roaming parameter: when at least one of the terminal-model-specific roaming parameters and the service-specific roaming parameter correction values are changed, re-calculating the roaming parameter of the terminal to reflect the change; and transmitting the re-calculated roaming parameter of the terminal to the terminal.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF THE EXEMPLARY EMBODIMENTS

Hereinafter, detailed exemplary embodiments of the present disclosure will be described with reference to the accompanying drawings. The following detailed description is provided to aid in the overall understanding of a method, an apparatus, and or a system stated in this specification. However, these are merely exemplary embodiments and the present disclosure is not limited thereto.

In the following description of the present disclosure, detailed descriptions of known art related to the present disclosure which would unnecessarily obscure the gist of the present disclosure will be omitted. The terms used in the following descriptions are defined in consideration of functions in the present disclosure and thus the definitions of these terms may be changed according to the intention of a user and an operator or depending on custom. Therefore, the definitions should be determined based on the entire content of the specification. Terms used in the detailed description are merely used for a detailed description of exemplary embodiments of the present disclosure and thus should not be construed as limiting or restricting the present disclosure. Unless clearly used otherwise, singular expressions include a plural meaning. In this specification, the terms "comprising," "including," etc. intend to express the existence of features, numerals, steps, elements, or the combinations thereof, and do not exclude the existence of one or more features, numerals, steps, elements, or the combinations thereof other than those stated above.

Figure 1:
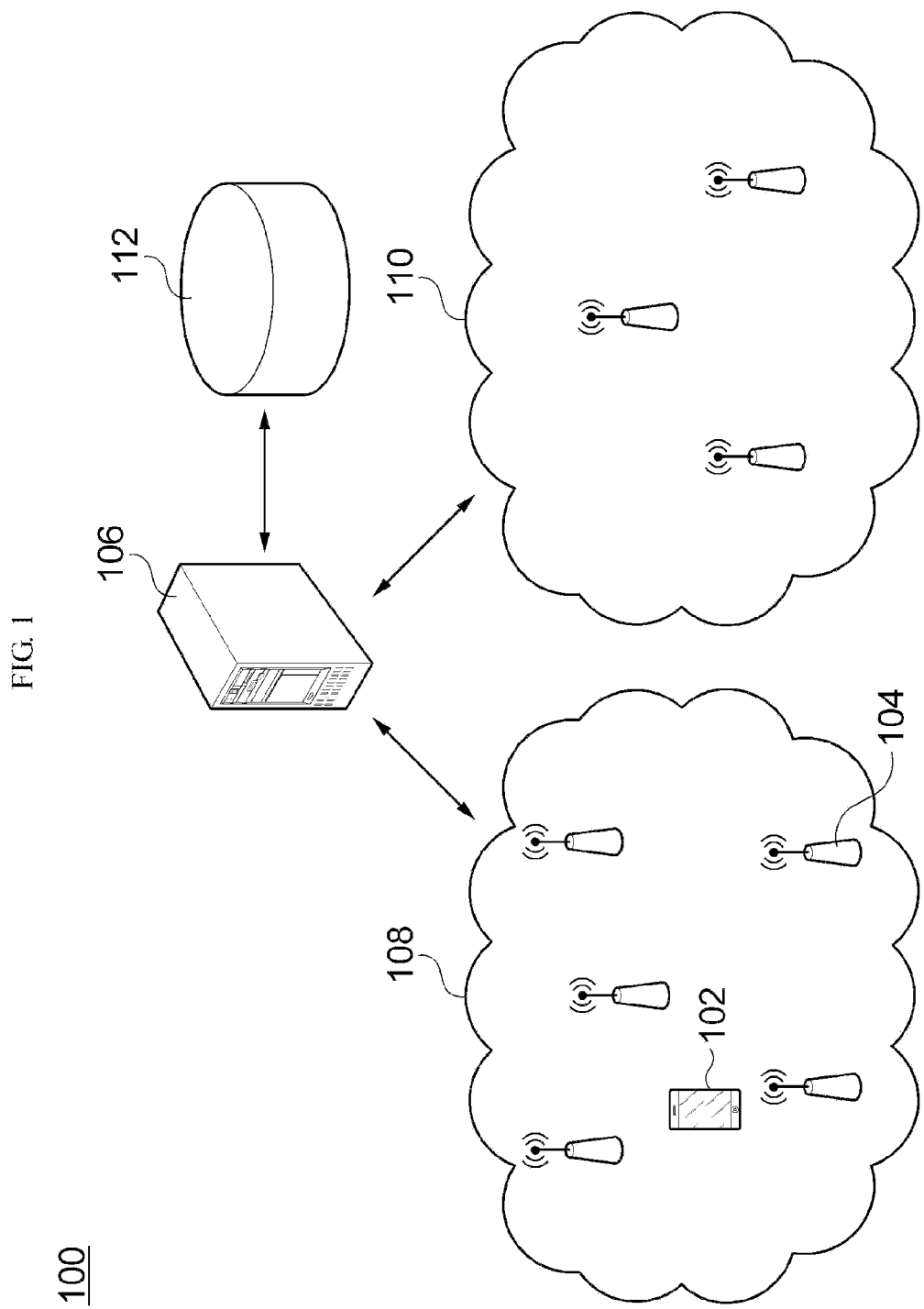
FIG. 1 is a block diagram showing a constitution of a system for providing a network service according to an exemplary embodiment of the present disclosure.

FIG. 1 is a block diagram showing a constitution of a system 100 for providing a network service according to an exemplary embodiment of the present disclosure. As shown in the drawing, the system 100 for providing a network service according to an exemplary embodiment of the present disclosure includes a terminal 102, one or more access points 104, a management server 106, and a user database 112.

In an exemplary embodiment of the present disclosure, a network 108 denotes a set of access points 104 located in a specific area or zone. In other words, one or more access points 104 located in the same area or adjacent areas constitute one network 108. A plurality of such networks 108 may be present in each area or zone. FIG. 1 shows an exemplary embodiment in which there are two networks including the network 108 and a network 110, but the present disclosure is not limited to the number of networks. An example of the networks may be a wireless local area network (LAN) (e.g., a wireless communication network in a company) installed in a specific building or in a specific area in a building, or so on.

The terminal 102 is provided with a wireless communication service through an access point 104. An example of the terminal may be a cellular phone, a personal digital assistant (PDA), a smart phone, a tablet computer, a laptop computer, etc., but any device which is connected to an access point 104 to transmit and receive packets may be the terminal 102 according to an exemplary embodiment of the present disclosure regardless of the type. The terminal 102 is configured to be portable by a user, and connects to an access point 104 which is closest to the current location of the terminal 102 or from which a signal having the highest strength is received.

When the terminal 102 recognizes the presence of the access point 104 adjacent thereto, the terminal 102 transmits an authentication request to the access point 104 first. Here, the authentication request may be information in a form required by a network service provider, such as an identifier (ID)/password or a media access control (MAC) address, to authenticate the terminal 102. When the authentication of the terminal upon the authentication request succeeds, the terminal 102 receives roaming parameters for roaming (or handoff) in the corresponding network 108 from the management server 106. In a wireless LAN network, there is no MAC layer signaling for setting a roaming parameter between the terminal 102 and the access point 104. Therefore, the roaming parameter is transmitted from the management server 106 to a wireless LAN connection application of the terminal 102 through an application layer message. The roaming parameters are values based on which the terminal 102 performs roaming in a currently connected network, and may include a roaming threshold, a scanning interval, a roaming delta value, etc. of the terminal 102. Details of the roaming parameter will be described below.

In networks located in different areas, even when a service is provided by the same network service provider, a roaming parameter may vary according to a variety of variables, such as characteristics of respective access points constituting the networks or geographical features of the corresponding areas, the locations of the installed access points, and installation intervals between the access points. Also, even when terminals connect to the same network, roaming parameters of the terminals may differ from each other according to performance of the terminals, services to be provided, and so on. For example, the wireless network performance of a latest terminal model is generally improved from a previous model, and therefore, while a previous terminal model requires roaming, a latest terminal model may perform communication without any problem at the same location. Further, in comparison with a general service, a service sensitive to the quality of a communication network, such as a voice over Internet protocol (VoIP) service, requires a shorter scanning interval and a higher roaming threshold.

Therefore, in exemplary embodiments of the present disclosure, fixed roaming parameters are not stored in the terminal 102 in advance, but roaming parameters appropriate for a network are dynamically downloaded upon new entry into the network, such that the terminal 102 may maintain optimal roaming parameters at all times without upgrading firmware. In this way, when roaming parameters are received from the access point 104, the terminal 102 may perform roaming between access points in the network 108 based on the received roaming parameters.

Next, the access point 104 provides a wireless network service to the connected terminal 102. As described above, one or more access points 104 located in the same area or adjacent areas constitute one network.

When the authentication request is received from the terminal 102 newly entering the corresponding network, the access point 104 transmits the authentication request to a separate authentication server (not shown) and allows or disallows connection of the terminal 102 according to the authentication result of the authentication server.

When the authentication succeeds, the terminal 102 receives roaming parameters of the network 108 to which the access point 104 belongs directly from the management server 106.

The management server 106 stores and manages network-specific roaming parameters, and transmits roaming parameters of the terminal 102 to the terminal 102 upon a request of the terminal 102. As mentioned above, the roaming parameters vary according to a currently connected network, the kind of the terminal 102, and the type of a service to be provided to the terminal 102.

The user database 112 is a database for storing and managing terminal-specific service subscription information. The user database 112 stores information on services (e.g., a VoIP service and an Internet service) to which terminals capable of accessing the aforementioned networks subscribe, and provides the information to the management server 106 upon a request of the management server 106.

Figure 2:
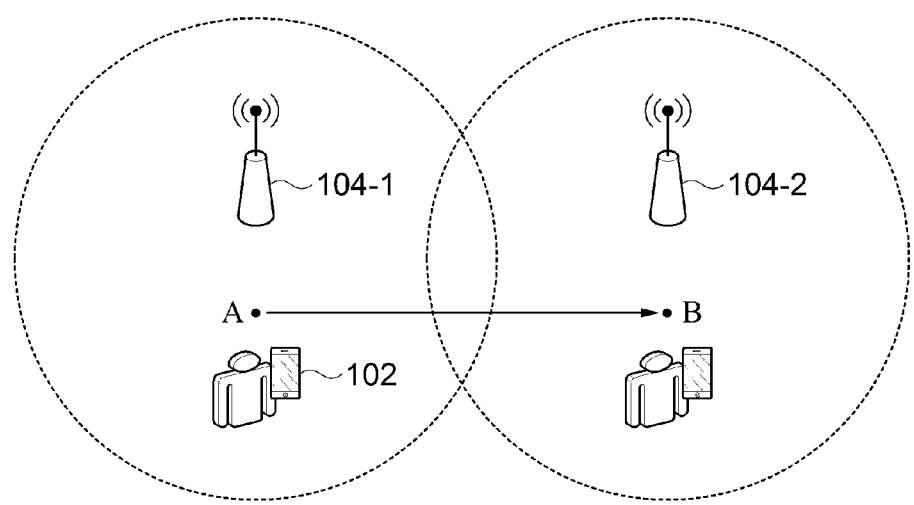
FIGS. 2 and 3 are example diagrams illustrating roaming in a wireless local area network (LAN) and roaming parameters for the roaming according to an exemplary embodiment of the present disclosure.
Figure 3:
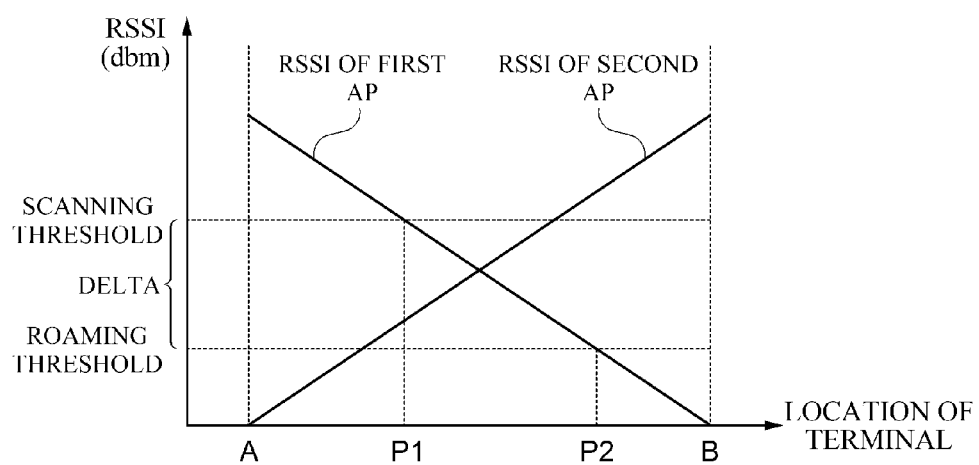

FIGS. 2 and 3 are example diagrams illustrating roaming in a wireless LAN and roaming parameters for the roaming according to an exemplary embodiment of the present disclosure.

For example, as shown in FIG. 2, it is assumed that the terminal 102 having connected to a first access point 104-1 at a spot A moves to an area (a spot B) in which a second access point 104-2 that is an access point in the same network is present. In this case, during a process in which the terminal 102 moves from the spot A to the spot B, the received signal strength indicator (RSSI) of the first access point 104-1 gradually decreases, whereas the RSSI of the second access point 104-2 gradually increases. Accordingly, during the movement process, the terminal 102 performs roaming to the second access point 104-2. This is presented in a graph shown in FIG. 3.

As shown in FIG. 3, when the terminal 102 moves from the spot A to the spot B, the RSSI of the first access point 104-1 gradually decreases, whereas the RSSI of the second access point 104-2 gradually increases. When the RSSI of the first access point 104-1 to which the terminal 102 is currently connected becomes a previously set scanning threshold or less at a spot $P_1$, the terminal 102 starts access point scanning to sense the presence of another surrounding wireless access point. For example, the terminal 102 may perform the scanning by transmitting a probe request for sensing the presence of a wireless access point in a previously set frequency band at previously set scanning intervals. Then, surrounding wireless access points which receive the probe request transmit responses corresponding to the probe request to the terminal 102, and the terminal 102 may select an access point to which to roam in consideration of the RSSIs of the received responses according to the respective access points. In the example shown in the drawings, it is assumed that the RSSI of the second access point 104-2 is the highest.

Subsequently, when the RSSI of the first access point 104-1 to which the terminal 102 is currently connected becomes a previously set roaming threshold or less at a spot $P_2$, the terminal 102 performs roaming to the second access point 104-2 using information on the second access point 104-2 acquired as a result of the scanning. Here, a difference between the scanning threshold and the roaming threshold is referred to as a roaming delta.

As described above, to perform roaming in a wireless LAN, the terminal 102 requires a roaming threshold, a roaming delta, and a scanning interval as roaming parameters, and a scanning threshold may be calculated from the roaming threshold and the roaming delta. A detailed constitution of the management server 106 for providing such roaming parameters according to terminals will be described below.

Figure 4:
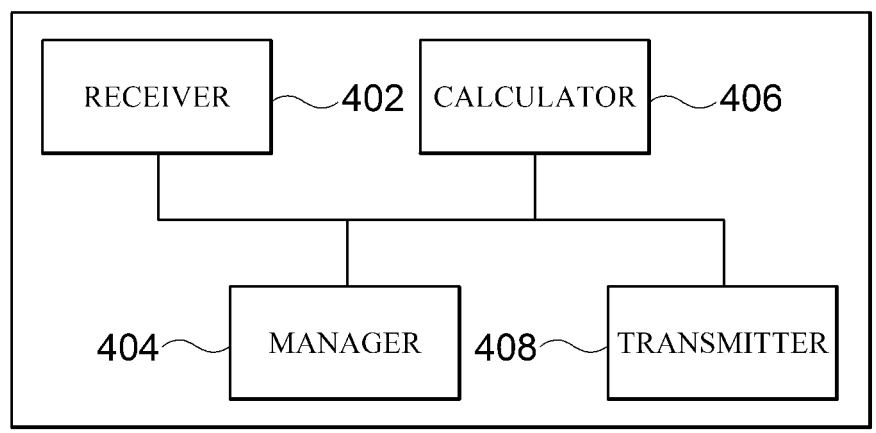
FIG. 4 is a block diagram showing a detailed constitution of a management server according to an exemplary embodiment of the present disclosure.

FIG. 4 is a block diagram showing a detailed constitution of the management server 106 according to an exemplary embodiment of the present disclosure. As shown in the drawing, the management server 106 according to an exemplary embodiment of the present disclosure includes a receiver 402, a manager 404, a calculator 406, and a transmitter 408.

The receiver 402 receives a connection information request from the terminal 102 connected to the wireless LAN 108. Here, the connection information request includes terminal information, specifically, information for identifying the model or kind of the terminal 102. For example, the terminal information may be the model number or the serial number of the terminal. Also, the connection information request may include information for identifying a user together with the terminal information of the terminal 102. Here, the information for identifying the user may be the ID of the user or so on.

The manager 404 stores and manages roaming parameters according to terminal models capable of accessing the network 108. As described above, the roaming parameters may include at least one of roaming thresholds, scanning intervals, and roaming delta values according to terminal models. Here, a roaming threshold denotes an RSSI value at a time point when the terminal 102 performs roaming, a scanning interval denotes a transmission interval of a probe request for access point scanning, a roaming delta value denotes an RSSI difference between the roaming threshold and a scanning threshold, and the scanning threshold denotes an RSSI value at a time point when the terminal 102 starts access point scanning for roaming.

For example, the manager 404 may store and manage a terminal-model-specific roaming parameter table as shown in Table 1 below.

TABLE 1

| Terminal Model | Roaming Threshold(dBm) | Scanning Interval | Roaming Delta (dBm) |
|---|---|---|---|
| M1 | −75 | 10 s | 10 |
| M2 | −78 | 10 s | 15 |

Also, together with such terminal-model-specific roaming parameters, the manager 404 may store and manage roaming parameter correction values according to services providable in the network 108. The correction values are used to correct the terminal-model-specific roaming parameter values. In other words, even terminals of the same model may have different roaming parameter correction values according to subscribed services. For example, the manager 404 may store and manage a service-specific roaming parameter correction value table as shown in Table 2 below.

TABLE 2

| Service Type | Roaming Threshold (dBm) Correction Value | Scanning Interval Correction Value | Roaming Delta (dBm) Correction Value |
|---|---|---|---|
| S1 | +3 | −5 s | −1 |
| S2 | 0 | 0 | 0 |

The calculator 406 calculates the roaming parameters of the terminal 102 using the terminal information received from the terminal 102 and the terminal-model-specific roaming parameters stored in the manager 404. For example, when a model name received from the terminal 102 is M1, the roaming parameters of the terminal 102 are as follows.

Roaming threshold: −75 dBm
Scanning interval: 10 seconds
Roaming delta: 10 dBm

Also, when the calculator 406 is configured to take a service being used by the user of the terminal 102 into consideration together with the model name of the terminal 102 according to an exemplary embodiment, the calculator 406 corrects the roaming parameters of the terminal 102 by applying the service-specific correction values to terminal-specific roaming parameters. For example, when the model name received from the terminal 102 is M1 and the type of a service used by the terminal 102 is S1, the roaming parameters of the terminal 102 are corrected as follows.

Roaming threshold: −75+3=−72 dBm
Scanning interval: 10−5=5 seconds
Roaming delta: 10−1=9 dBm Here, the type of the service used by the terminal 102 may be provided by the above-described user database 112. Specifically, the calculator 406 may transmit the user information and the terminal information received by the receiver 402 to the user database 112, and receive service information corresponding to the user information and the terminal information from the user database 112. To this end, the user database 112 may store and manage a user-specific service subscription information table as shown in Table 3 below. According to an exemplary embodiment, the calculator 406 is also capable of directly receiving the service information from the terminal 102.

TABLE 3

| User | Terminal Model | Service Type |
|---|---|---|
| A | M1 | S1 |
| B | M2 | S2 |
| C | M1 | S2 |

Finally, the transmitter 408 transmits the roaming parameters calculated by the calculator 406 to the terminal 102.

The terminal-specific roaming parameters or the service-specific roaming parameter correction values are not fixed but may be changed in consideration of a network situation and so on. For example, the terminal-specific roaming parameters may be changed by addition or a change of access points in a network. Also, when service requirements are changed by a change in the service level agreement (SLA) of a specific service, roaming parameter correction values of the service may be changed. When the terminal-specific roaming parameters or the service-specific roaming parameter correction values are changed, the calculator 406 may re-calculate the roaming parameters of the terminal 102 to reflect the changed correction values.

The reason that the management server 106 sets different roaming parameters according to the kinds of terminals and services is as follows.

Terminals capable of being provided with a wireless LAN service have different types of wireless performance according to the respective release dates thereof and the respective types of communication-related hardware and software used therein. Table 4 below shows an example for a comparison of wireless transceiving performance according to the types of terminals.

TABLE 4

| Data Rate (Mbps) | Minimum Sensitivity | Terminal A (High-performance communication chip) RX Sensitivity | Terminal B (Low-performance communication chip) RX Sensitivity |
|---|---|---|---|
| 9 | −81 | −90 | −84 |
| 12 | −79 | −89 | −82 |
| 18 | −77 | −88 | −80 |
| 24 | −74 | −86 | −77 |
| 36 | −70 | −83 | −73 |
| 48 | −66 | −78 | −69 |
| 54 | −65 | −77 | −68 |

In the above table, the second column "Minimum Sensitivity" shows data-rate-specific lowest receiver sensitivities (RxSs) conforming to a communication standard (801.11a), and the third and fourth columns show data-rate-specific RxSs defined according to the types of communication chips. A terminal determines the data rate thereof by comparing an RSSI received from an access point and the RxS of a communication chip thereof. For example, when an RSSI received from an access point is −83 dBm in the above table, terminal A and terminal B set data rates to 36 Mbps and 9 Mbps, respectively. In other words, even in the same network situation, terminal-specific wireless transceiving performance varies according to the types of communication chips used in terminals.

When roaming parameters are uniformly set according to networks regardless of such difference in wireless transceiving performance between terminals, an administrator sets roaming parameters based on a terminal of low performance to ensure the wireless LAN performance of all terminals. However, in this case, the same uniform roaming parameter is applied to a terminal of high wireless performance, and thus the terminal performs access point scanning and roaming even when roaming is unnecessary. This directly results in an increase in battery consumption of the terminal. Also, since roaming of a terminal involves transmitting and receiving a probe request and a response signal between the terminal and an access point, unnecessary roaming may increase signal interference of the corresponding network.

Further, a roaming parameter is necessary to be set differently according to services used by a terminal. For example, in comparison with a general service, a service sensitive to the quality of a communication network and a time delay, such as a VoIP service, requires a shorter scanning interval and a higher roaming threshold. However, when roaming parameters of all terminals are uniformly applied for this reason, unnecessary access point scanning and roaming occur to a user of another service who does not experience any problem in using the other service even with a weak wireless LAN signal.

Therefore, in an exemplary embodiment of the present disclosure, optimized roaming parameter values are set in consideration of the wireless transceiving performance of each terminal and a service to be used by a terminal user, such that the aforementioned problems may be solved.

Figure 5:
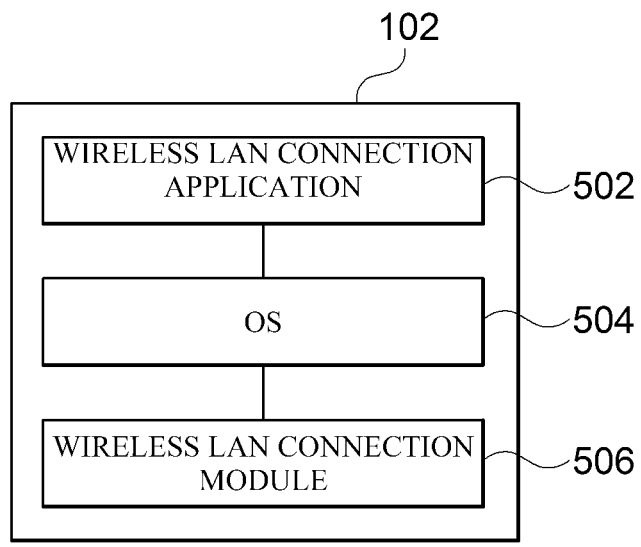
FIG. 5 is a block diagram showing a detailed constitution of a terminal according to an exemplary embodiment of the present disclosure.

FIG. 5 is a block diagram showing a detailed constitution of the terminal 102 according to an exemplary embodiment of the present disclosure. As shown in the drawing, the terminal 102 according to an exemplary embodiment of the present disclosure includes a wireless LAN connection application 502, an operating system (OS) 504, and a wireless LAN connection module 506.

The wireless LAN connection application 502 is an application for controlling wireless LAN connection of the terminal 102, and may be installed and run on the OS 504 of the terminal 102. The wireless LAN connection application 502 is configured to perform a network connection function, an authentication function, a roaming parameter setting function, and other functions of the terminal 102.

The OS 504 provides a platform for managing system hardware of the terminal 102 and running the aforementioned wireless LAN connection application 502 and so on. In exemplary embodiments of the present disclosure, when a roaming parameter value is received from the management server 106, the wireless LAN connection application 502 changes the roaming parameter of the wireless LAN connection module 506 through a setting function provided by the OS 504.

The wireless LAN connection module 506 denotes software (firmware, etc.) and hardware resources for the terminal 102 to perform wireless LAN connection and exchange data with a connected wireless LAN. The wireless LAN connection module 506 may perform roaming between wireless access points according to roaming parameters which are fundamentally set upon manufacturing of the terminal 102. Also, as described above, when a new roaming parameter setting value is received from the OS 504, the wireless LAN connection module 506 may change an existing roaming parameter to the received new value.

Figure 6:
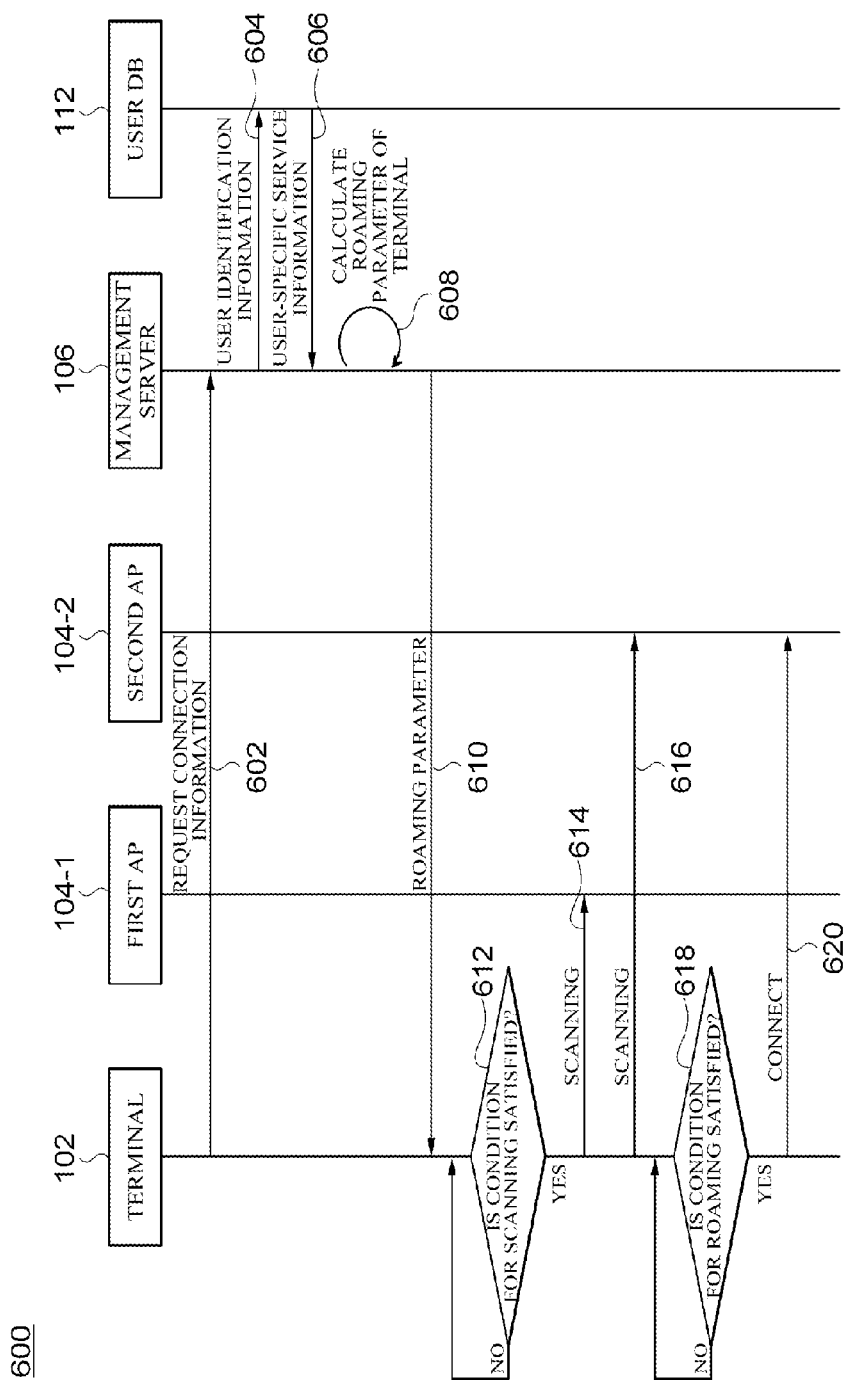
FIG. 6 is a flowchart illustrating a method of setting a roaming parameter according to an exemplary embodiment of the present disclosure.

FIG. 6 is a flowchart illustrating a method 600 of setting a roaming parameter according to an exemplary embodiment of the present disclosure. In the shown flowchart, it is assumed that the terminal 102 connected to the first access point 104-1 moves and performs roaming to the second access point 104-2 in the same network.

In operation 602, the wireless LAN connection application 502 of the terminal 102 request connection information of the corresponding network to the management server 106. As described above, the connection information request may include terminal information, specifically, information for identifying the model or kind of the terminal 102. Also, the connection information request may be transmitted to the management server 106 via the first access point 104-1 currently in connection with the terminal 102.

In operation 604, the management server 106 transmits user information and the terminal information included in the received connection information request to the user database 112.

In operation 606, the user database 112 transmits service information corresponding to the received user information and terminal information to the management server 106.

In operation 608, the management server 106 calculates roaming parameters of the terminal 102 using previously stored terminal-model-specific roaming parameters and service-specific roaming parameter correction values. A detailed process of calculating roaming parameters has been described above.

In operation 610, the management server 106 transmits the calculated roaming parameters to the terminal 102. Subsequently, the wireless LAN connection application 502 of the terminal 102 changes previously stored roaming parameters of the wireless LAN connection module 506 to the received roaming parameters. As described above, the wireless LAN connection application 502 may change roaming parameters of the wireless LAN connection module 506 using a setting function, etc. provided by the OS 504 of the terminal 102.

In operation 612, the terminal determines whether or not scanning for roaming is necessary by comparing a received roaming parameter and the RSSI of the first access point 104-1 to which the terminal 102 is currently connected. Specifically, when the RSSI is smaller than the sum of a received roaming threshold and a received roaming delta, the terminal 102 determines that the scanning is necessary.

When it is determined in operation 612 that the scanning is necessary, the terminal 102 performs access point scanning for roaming in operations 614 and 616.

In operation 618, the terminal 102 determines whether or not roaming is necessary by comparing a received roaming parameter and the RSSI of the first access point 104-1 to which the terminal 102 is currently connected. Specifically, when the RSSI is smaller than the received roaming threshold, the terminal 102 determines that roaming is necessary.

When it is determined in operation 618 that roaming is necessary, the terminal 102 performs roaming to the second access point 104-2 having the highest RSSI at the corresponding location in operation 620.

As described above, in exemplary embodiments of the present disclosure, it is particularly possible to prevent a terminal of relatively better wireless communication performance from performing unnecessary scanning and roaming by applying different roaming parameters for wireless LAN roaming to terminals connected to a wireless LAN according to the models of the terminals and services to be used by the terminals. Therefore, the power consumption of the terminals can be lowered.

In addition, in exemplary embodiments of the present disclosure, it is possible to reduce the number of transmissions of a probe request generated upon scanning and roaming of a terminal in a network and a response to the probe request. Therefore, unnecessary network interference can be reduced.

Meanwhile, exemplary embodiments of the present disclosure may include a computer-readable recording medium including a program for performing the methods described in this specification in a computer. The computer-readable recording medium may include program instructions, local data files, and local data structures alone or in combination. The medium may be specially designed and configured for the present disclosure, or well known and available to those of ordinary skill in the field of computer software. Examples of the computer-readable recording medium include magnetic media such as a hard disk, a floppy disk, and a magnetic rape, optical recording media such as a compact disc read-only memory (CD-ROM) and a digital versatile disc (DVD), a magneto-optical medium such as a floptical disk, and hardware devices specially configured to store and execute program instructions such as a ROM, a random access memory (RAM), and a flash memory. Examples of the program instructions may include high-level language codes executable by a computer using an interpreter, etc., as well as machine language codes made by a compiler.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. An apparatus configured to set a roaming parameter, the apparatus comprising:
   a receiver configured to receive terminal information from a terminal connected to a wireless local area network (LAN), the terminal information comprising information of a model of the terminal and information of a user of the terminal;
   a calculator configured to calculate a roaming parameter of the terminal based on the received terminal information and roaming parameters corresponding to terminal models connectable to the wireless LAN; and a transmitter configured to transmit the calculated roaming parameter to the terminal.

2. The apparatus of claim 1, wherein the roaming parameter comprises at least one among a roaming threshold, a scanning interval, and a roaming delta value of the terminal.

3. The apparatus of claim 1, further comprising:
a manager configured to manage the roaming parameters and roaming parameter correction values corresponding to services providable in the wireless LAN,
the calculator is further configured to correct the calculated roaming parameter based on information of a service used by the terminal and the roaming parameter correction values.

4. The apparatus of claim 3, wherein the calculator is further configured to receive the information of the service used by the terminal from a user database configured to manage services corresponding to terminals that use the services.

5. The apparatus of claim 3, wherein the calculator is further configured to receive the information of the service used by the terminal from the terminal.

6. The apparatus of claim 3, wherein, in response to at least one among the roaming parameters and the roaming parameter correction values being changed:
the calculator is further configured to re-calculate the roaming parameter based on the change; and
the transmitter is further configured to transmit the re-calculated roaming parameter to the terminal.

7. A method of setting a roaming parameter, the method comprising:
receiving terminal information from a terminal connected to a wireless local area network (LAN), the terminal information comprising information of a model of the terminal and information of a user of the terminal;
calculating a roaming parameter of the terminal based on the received terminal information and roaming parameters corresponding to terminal models connectable to the wireless LAN; and
transmitting the calculated roaming parameter to the terminal.

8. The method of claim 7, wherein the roaming parameter of the terminal comprises at least one among a roaming threshold, a scanning interval, and a roaming delta value of the terminal.

9. The method of claim 7, further comprising correcting the calculated roaming parameter based on information of a service used by the terminal and roaming parameter correction values corresponding to services providable in the wireless LAN.

10. The method of claim 9, further comprising receiving the information of the service used by the terminal from a user database configured to manage services corresponding to terminals that use the services.

11. The method of claim 9, further comprising receiving the information of the service used by the terminal from the terminal.

12. The method of claim 9, further comprising, in response to at least one among the roaming parameters and the roaming parameter correction values being changed:
re-calculating the roaming parameter based on the change; and
transmitting the re-calculated roaming parameter to the terminal.

* * * * *